US008762982B1

(12) United States Patent
Goslee

(10) Patent No.: US 8,762,982 B1
(45) Date of Patent: Jun. 24, 2014

(54) METHOD FOR PROGRAMMING AN INSTRUMENT CLUSTER

(75) Inventor: Nathan V. Goslee, Ypsilanti, MI (US)

(73) Assignee: Yazaki North America, Inc., Canton, MI (US)

( * ) Notice: Subject to any disclaimer, the term of this patent is extended or adjusted under 35 U.S.C. 154(b) by 1030 days.

(21) Appl. No.: 12/488,963

(22) Filed: Jun. 22, 2009

(51) Int. Cl.
*G06F 9/44* (2006.01)

(52) U.S. Cl.
USPC ........... 717/172; 717/169; 717/171; 717/176; 717/177; 701/29.1; 701/31.4

(58) Field of Classification Search
None
See application file for complete search history.

(56) References Cited

U.S. PATENT DOCUMENTS

| | | | | |
|---|---|---|---|---|
| 5,915,026 | A | 6/1999 | Mankovitz | |
| 5,991,672 | A * | 11/1999 | Rendi et al. ...................... | 701/71 |
| 6,167,061 | A | 12/2000 | Nakatsugawa | |
| 6,219,736 | B1 * | 4/2001 | Klingman ...................... | 710/315 |
| 6,441,510 | B1 | 8/2002 | Hein et al. | |
| 6,594,723 | B1 * | 7/2003 | Chapman et al. .............. | 711/103 |
| 6,654,816 | B1 * | 11/2003 | Zaudtke et al. ................... | 710/1 |
| 6,747,982 | B2 | 6/2004 | Nakatsugawa | |
| 6,827,265 | B2 * | 12/2004 | Knowles et al. ......... | 235/462.01 |
| 7,023,683 | B1 | 4/2006 | Guo et al. | |
| 7,082,528 | B2 * | 7/2006 | Zaudtke et al. .................... | 713/2 |
| 7,086,049 | B2 * | 8/2006 | Goodman ...................... | 717/168 |
| 7,135,964 | B2 | 11/2006 | Namaky et al. | |
| 7,185,191 | B2 * | 2/2007 | Bosley et al. ...................... | 713/2 |
| 7,206,367 | B1 * | 4/2007 | Moore .......................... | 375/354 |
| 7,310,335 | B1 * | 12/2007 | Garcia-Luna-Aceves et al. ............................. | 370/390 |
| 7,441,189 | B2 | 10/2008 | Michaels | |
| 7,461,374 | B1 * | 12/2008 | Balint et al. .................. | 717/174 |
| 7,783,593 | B2 * | 8/2010 | Espino ........................... | 707/609 |
| 2002/0166856 | A1 | 11/2002 | Yoshie | |
| 2002/0193955 | A1 * | 12/2002 | Bertness et al. ................. | 702/63 |
| 2003/0163508 | A1 * | 8/2003 | Goodman ...................... | 709/100 |
| 2004/0032703 | A1 | 2/2004 | Ikeda | |
| 2004/0080938 | A1 * | 4/2004 | Holman et al. ................ | 362/231 |
| 2004/0199897 | A1 * | 10/2004 | Ghercioiu et al. ............. | 717/101 |
| 2004/0244045 | A1 * | 12/2004 | Miyamoto et al. ............. | 725/112 |
| 2004/0263494 | A1 * | 12/2004 | Poor et al. ...................... | 345/204 |
| 2005/0075685 | A1 | 4/2005 | Forsberg et al. | |
| 2005/0083965 | A1 * | 4/2005 | Sodergren ...................... | 370/463 |
| 2005/0093808 | A1 * | 5/2005 | Kang et al. ....................... | 345/99 |
| 2005/0122915 | A1 | 6/2005 | Norizuki | |
| 2005/0156753 | A1 * | 7/2005 | DeLine et al. .............. | 340/693.5 |
| 2005/0224716 | A1 * | 10/2005 | Armentrout et al. ...... | 250/339.06 |
| 2006/0007094 | A1 * | 1/2006 | Kang et al. ....................... | 345/98 |
| 2006/0020999 | A1 * | 1/2006 | Schlarb ......................... | 725/153 |
| 2006/0026588 | A1 * | 2/2006 | Illowsky et al. .............. | 717/171 |
| 2006/0041854 | A1 | 2/2006 | Schlanger et al. | |
| 2006/0082643 | A1 * | 4/2006 | Richards ......................... | 348/36 |
| 2006/0126150 | A1 * | 6/2006 | Tonar et al. .................... | 359/265 |

(Continued)

*Primary Examiner* — Chameli Das
(74) *Attorney, Agent, or Firm* — Harness, Dickey & Pierce, P.L.C.

(57) ABSTRACT

A method of reprogramming a flash memory of a liquid crystal display (LCD) in a presentation device can include using an external electronic diagnostic tool and a controller area network (CAN) diagnostic interface within the device to initiate data transfer. Data can be transmitted to an LCD microcontroller within the device using a high speed infrared link between the diagnostic tool and microcontroller. The data can be stored in a memory within the device in bi-directional communication with the microcontroller. Proper reception by the microcontroller of the infrared transmitted data can be verified by the diagnostic tool and the CAN diagnostic interface. A command can be issued from the diagnostic tool directing how to employ the data to reprogram the LCD.

12 Claims, 2 Drawing Sheets

(56) References Cited

U.S. PATENT DOCUMENTS

| | | |
|---|---|---|
| 2006/0149870 A1* | 7/2006 | Sears et al. .................. 710/71 |
| 2006/0259938 A1* | 11/2006 | Kinoshita et al. ............ 725/118 |
| 2007/0021053 A1* | 1/2007 | Marrah ...................... 455/3.02 |
| 2007/0180443 A1* | 8/2007 | Kondo et al. ................ 717/168 |
| 2007/0240146 A1* | 10/2007 | Chinnadurai et al. ........ 717/168 |
| 2008/0104583 A1* | 5/2008 | Wempen et al. ............. 717/168 |
| 2008/0209413 A1* | 8/2008 | Kakumani et al. ........... 717/172 |
| 2008/0212215 A1* | 9/2008 | Schofield et al. ............. 359/844 |
| 2008/0270075 A1 | 10/2008 | Bertosa et al. |
| 2008/0284575 A1* | 11/2008 | Breed .......................... 340/438 |
| 2009/0119657 A1* | 5/2009 | Link, II ....................... 717/171 |
| 2009/0231323 A1* | 9/2009 | Kang et al. .................. 345/213 |
| 2009/0289928 A1* | 11/2009 | Shi .............................. 345/209 |
| 2009/0290369 A1* | 11/2009 | Schofield et al. ............. 362/494 |
| 2011/0258310 A1* | 10/2011 | Sodergren .................... 709/224 |
| 2012/0016548 A1* | 1/2012 | Jaenke et al. ................. 701/22 |
| 2012/0237028 A1* | 9/2012 | Khazan et al. ............... 380/201 |
| 2013/0190952 A1* | 7/2013 | Severson ...................... 701/19 |
| 2013/0325323 A1* | 12/2013 | Breed .......................... 701/420 |

\* cited by examiner

METHOD FOR PROGRAMMING AN INSTRUMENT CLUSTER

FIELD

The present disclosure relates to instrument clusters and more particularly to an instrument cluster and method for wirelessly communicating data from a diagnostic tool to the instrument cluster or any vehicle system visible by the user.

BACKGROUND

This section provides background information related to the present disclosure which is not necessarily prior art.

Automotive instrument clusters typically comprise large discreet display areas for a speedometer, a tachometer, and a number of smaller displays for coolant temperature, oil pressure, oil temperature, fuel level and the like. Arranged within and around the cluster are other indicators showing low fluid level conditions, turn signal operation, emergency light blinkers and so forth. In a conventional display, a rotating analog needle or pointer is provided for sweeping across a range of values to indicate a measured quantity. In other examples, a light beam can be used to scan across a similar range of values. Other configurations include digital displays that are operable to simply display a numerical value associated with a given unit of measurement.

In some instances, these instrument clusters may need to be reprogrammed, such as when a software update is needed. Generally, reprogramming can occur over the general controller area network (CAN) bus using an onboard module in the vehicle that acts as a diagnostic gateway. In many instances, a diagnostic connector in the foot well of the driver's side of the vehicle can be accessed by connecting a wired link from a handheld electronic device. This diagnostic connector provides a communication link that is generally optimized for response time and is not ideal for large file transfer speed. For example, in many instances, the top speed of the CAN by way of the wired diagnostic connector can be about 500 kilobytes per second. In real use, however, it is typical to only utilize 60% for data transfer, which leaves about 300 kilobits per second as a maximum data rate of transfer. This can be reduced further by the multiple connected modules.

Instrument clusters have been evolving recently to incorporate thin film transistor liquid crystal displays (TFT-LCD). The TFT-LCD's can be configured to display any information, such as information associated with any of the gauges and indicators listed above and/or information related to various components of the vehicle, such as the engine, transmission, fuel system and the like. As can be appreciated, the TFT-LCD's graphics can require an increased amount of stored data for operation. For example, some TFT-LCD displays can utilize between eight and sixteen megabytes of storage. With the conventional CAN bus update method utilizing the diagnostic connector described above, a reprogramming event can take over one hour per cluster.

SUMMARY

This section provides a general summary of the disclosure, and is not a comprehensive disclosure of its full scope or all of its features.

A method of reprogramming a flash memory of a liquid crystal display (LCD) in a presentation device can include using an external electronic diagnostic tool and a controller area network (CAN) diagnostic interface within the device to initiate data transfer. Data can be transmitted to an LCD microcontroller within the device using a high speed infrared link between the diagnostic tool and microcontroller. The data can be stored in a memory within the device in bi-directional communication with the microcontroller. Proper reception by the microcontroller of the infrared transmitted data can be verified by the diagnostic tool and the CAN diagnostic interface or the infrared link if bi-directional. A command can be issued from the diagnostic tool directing how to employ the data to reprogram the LCD.

According to additional features, the data can be transmitted through an infrared (IR) signal between the diagnostic tool and the microcontroller. Using the external electronic diagnostic tool can include locating the diagnostic tool proximate to a CAN diagnostic interface. Using the CAN diagnostic interface can include using a destination infrared (IR) receiver provided on the presentation device to receive the transmitted data through the high speed infrared link. In one example, the destination IR receiver includes a universal asynchronous receiver transmitter (UART). According to one implementation, transmitting the data can include transmitting the data from the external electronic diagnostic tool through a source infrared (IR) transmitter provided on the external electronic diagnostic tool.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
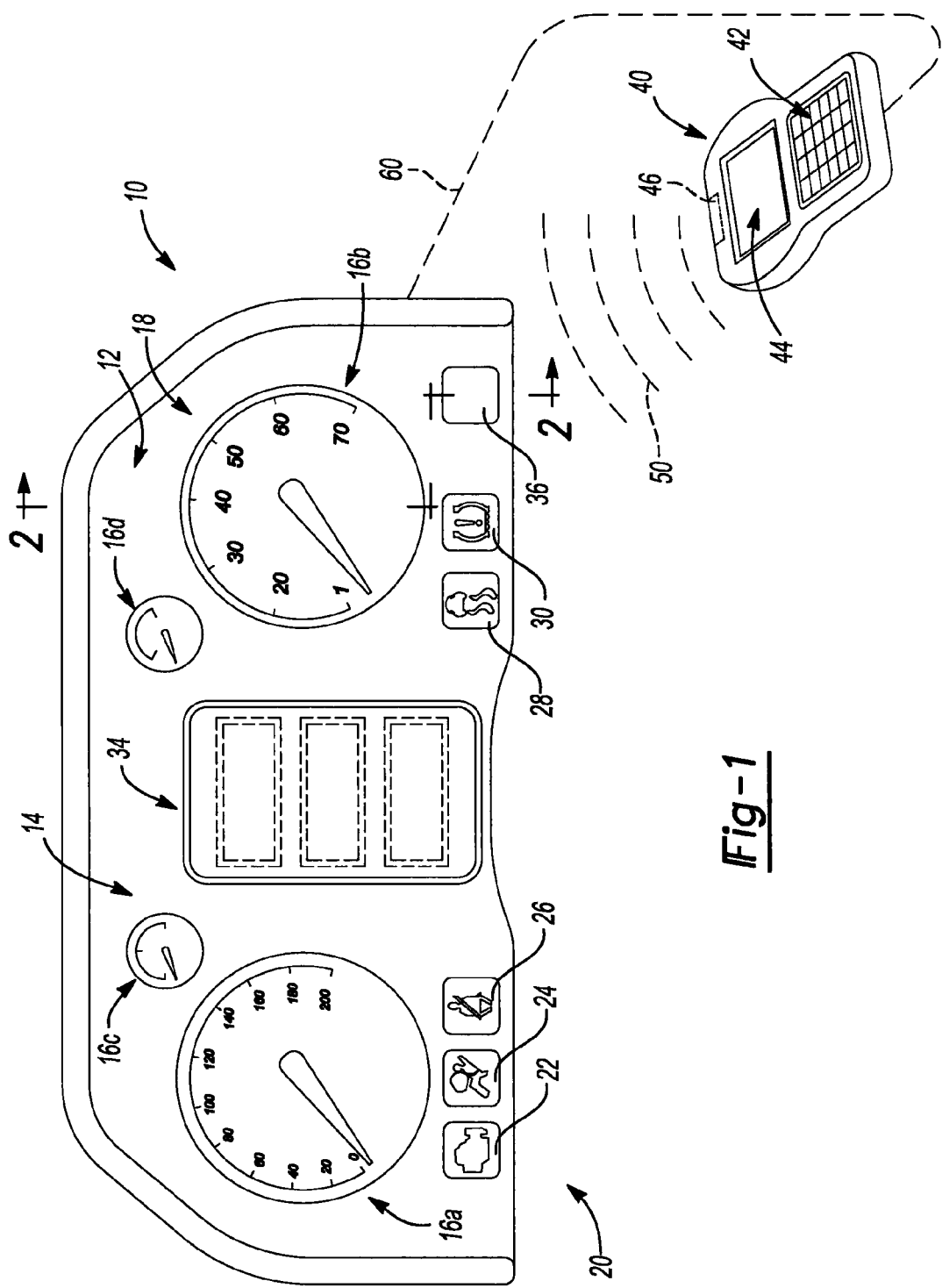
FIG. 1 is a front view of an instrument cluster having a TFT-LCD and infrared (IR) transmitter/receiver according to one example of the present teachings and shown associated with an exemplary external electronic diagnostic tool.

With initial reference to FIG. 1, a presentation device in the form of an instrument cluster constructed in accordance with one example of the present teachings is shown and generally identified at reference numeral 10. The instrument cluster 10 can have a fascia 12 including a display 14. The display 14 can comprise a plurality of gauges 16*a*-16*d* for displaying measured quantities. In one example, the gauges 16*a*-16*d* can be formed in an appliqué 18. The appliqué 18 in the embodiment shown may be taken to be representative of a speedometer display (gauge 16*a*) for displaying vehicle speed, a tachometer display (gauge 16*b*) for displaying engine speed, a fuel level display (gauge 16*c*) for displaying a fuel level, and an engine temperature display (gauge 16*d*) for displaying an engine temperature.

While the gauges 16*a*-16*d* have been specifically described as being a designed for display of a specific measured quantity, any of the gauges 16*a*-16*d* can be configured to represent other measured quantities, such as, but not limited to, a coolant temperature, an oil pressure, a cabin temperature, an outside temperature, and the like. Furthermore, the gauge locations of any of the gauges 16*a*-16*d* are interchangeable. Moreover, one or more of the gauges 16*a*-16*d* may be eliminated or more gauges may be added without departing from the scope of the present disclosure.

Various non-analog displays or "tell-tales" collectively referred to at reference numeral 20 can include a check engine display 22, an airbag display 24, a safety restraint display 26, a traction control display 28 and a tire pressure display 30. Other tell-tales may also be provided.

The instrument cluster 10 can further include a TFT-LCD 34 and a destination infrared transmitter/receiver 36. The TFT-LCD 34 can be configured to display any information, such as any measured quantity described above associated with the gauges 16*a*-16*d*, and/or any of the display information associated with the tell-tales 20. The TFT-LCD 34 can additionally or alternatively be configured to display information associated with a trip computer, a navigation system, a vehicle entertainment system, or any other information that may be useful for the vehicle operator. As will be described in greater detail herein, the destination IR transmitter/receiver 36 can be in the form of a universal asynchronous receiver transmitter (UART).

Figure 2:
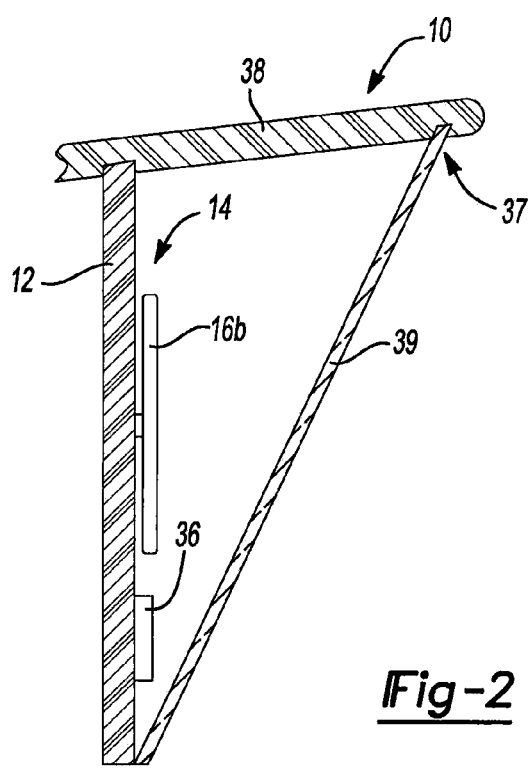
FIG. 2 is a cross-sectional view taken along lines 2-2 of the instrument cluster shown in FIG. 1.

As illustrated in FIG. 2, the instrument cluster 10 can include a housing 38 that has an overhang 37 and a transparent pane 39. The overhang 37 can provide a partial shield or barrier for shading sunlight and/or ambient light from the destination IR transmitter/receiver 36. The overhang 37 can help minimize interference from sunlight and/or ambient light near the destination IR transmitter/receiver 36, such as during a data transmitting event as will be described. It will be appreciated that the destination IR transmitter/receiver can be located elsewhere in the instrument cluster 10, such as closer to the overhang 37.

With continued reference to FIG. 1, an external electronic diagnostic tool 40 is shown. The external electronic diagnostic tool 40 can have a user interface 42, a display 44, a source IR transmitter/receiver 46 and a controller area network (CAN) diagnostic interface 48. The external electronic diagnostic tool 40 is operable in one configuration to transmit an IR signal 50 from the source IR transmitter/receiver 46 that can be received by the destination IR transmitter/receiver 36 in the instrument cluster 10. According to one example, an infrared link can be provided between the destination IR transmitter/receiver 36 and the source IR transmitter/receiver 46 for communicating data through a contact-less high speed communication link. The destination IR transmitter/receiver 36 can respond via a main microcontroller 54 via the CAN diagnostic interface 48.

The data received by the destination IR transmitter/receiver 36 can be communicated between the main micro-controller 54 and/or a display micro-controller 56 by way of a serial peripheral interface. The main micro-controller 54 can communicate signals between various modules of the vehicle (i.e. such as related to an engine, transmission, body control, etc.). The display micro-controller 56 can communicate signals to the TFT-LCD 34. In one example, the external electronic diagnostic tool 40 can provide a UART signal that may be converted to an IR output (i.e., the IR signal 50). The IR signal can be a high speed IR signal that communicates up to or more than 125 kilobytes per second.

Figure 3:
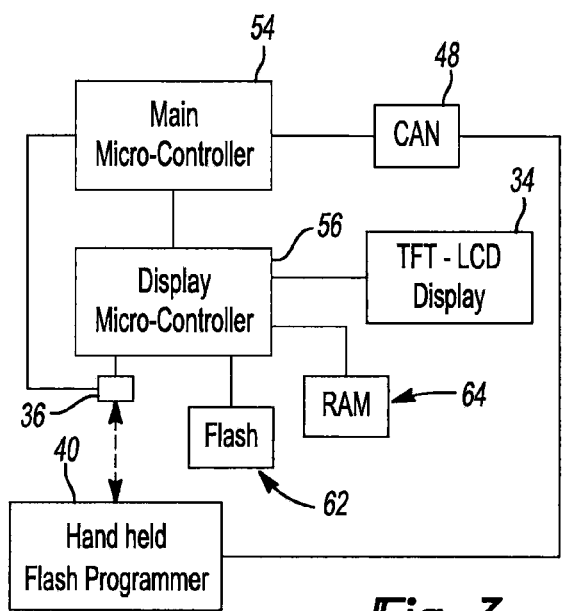
FIG. 3 is an exemplary schematic view of a main microcontroller, a display micro-controller, the TFT-LCD display and the external electronic diagnostic tool according to one example of the present teachings.

This IR signal 50 received by the destination IR transmitter/receiver 36 can then be converted by a photo detector (such as a photo transistor or a photo diode) back to a logic level signal for use by receiving circuitry associated with the instrument cluster 10, such as the main micro-controller 54 and/or the display micro-controller 56 (see FIG. 3). The receiving circuitry provides a physical interface to the IR signal. Additionally, it can perform message verification, check sum, buffering and handles the flash programming. The infrared link can be bi-directional by placing a transmitter/receiver pair on both of the source object (the external electronic diagnostic tool 40) and the destination object (the destination IR transmitter/receiver 36). In another example, such as when the infrared link is uni-directional, a wired CAN connection 60 (illustrated in phantom) can be provided between external electronic diagnostic tool 40 and the instrument cluster 10.

The infrared link provided by the combination source and destination IR transmitter/receiver 46, 36 through the IR signal 50 provides a high speed, low cost configuration for communicating data to an internal flash 62, FIG. 3, such as during a software update. This results in the ability to reduce reprogramming time by a factor of about 50 or more over current conventional methods, such as by using a wired connection through a diagnostic connector described above.

Figure 4:
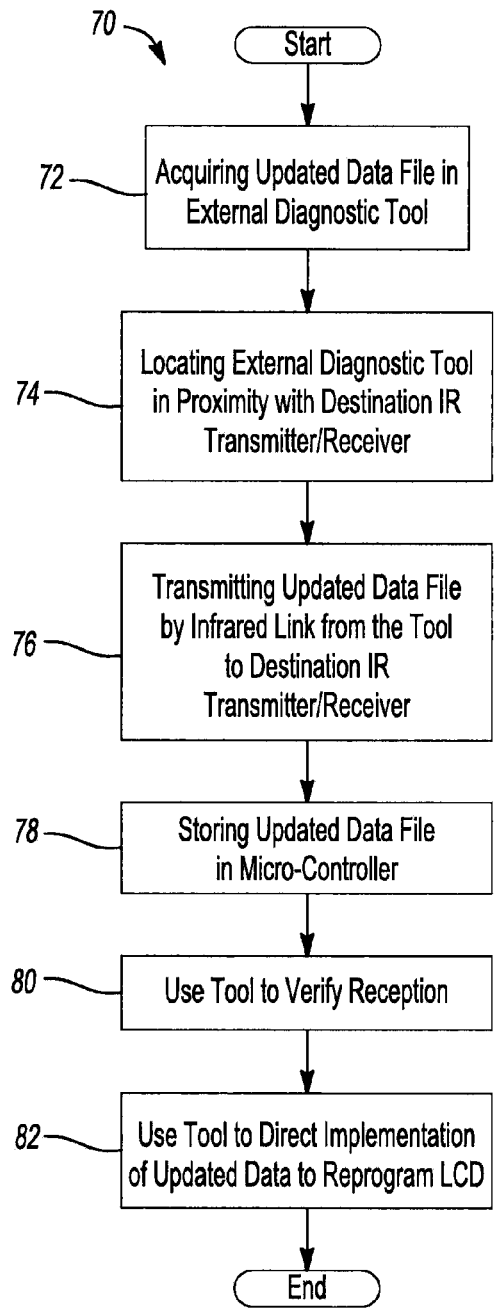
FIG. 4 is an exemplary method of reprogramming the TFT-LCD display in the instrument cluster according to one example of the present teachings.

Turning now to FIG. 4, an exemplary method of reprogramming the flash 62 of the instrument cluster 10 using the external electronic diagnostic tool 40 is shown and generally identified at reference numeral 70. At the outset, an updated data file is acquired or transferred onto the external electronic diagnostic tool 40 in step 72. It is appreciated that the updated data file can be created remotely and subsequently transferred onto the external electronic diagnostic tool 40. In other examples, the external electronic diagnostic tool 40 can be used to create the updated data file, such as by using the user interface 42.

In step 72, the external electronic diagnostic tool 40 is located in proximity with the destination IR transmitter/receiver 36. In step 76, the updated data file is transmitted through the IR signal 50 from the source IR transmitter/receiver 46 on the external electronic diagnostic tool 40 to the destination IR transmitter/receiver 36 provided on the instrument cluster 10. In step 78, the updated data file is then stored in the display micro-controller 56, such as in a random access module (RAM) 64. In some examples, the updated data file can additionally or alternatively be stored for use by the main micro-controller 54. In step 80, the external electronic diagnostic tool 40 can be used to verify reception of the updated data file by the display micro-controller 56. In step 82, the external electronic diagnostic tool 40 can be used to direct implementation of the updated data file to reprogram the flash 62. Additionally, steps 78 and 82 can occur multiple times in a block transfer manner, such as 5% at a time.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
providing a vehicle instrument cluster having a housing, a transparent pane, a plurality of vehicle gauges, a plurality of tell-tale indicators, an instrument cluster controller and a presentation device, the transparent pane being coupled to the housing and defining a cavity in which the vehicle gauges, the tell-tale indicators, and the display are housed, the plurality of vehicle gauges comprising a vehicle speedometer and an engine tachometer, the instrument cluster controller being configured to receive vehicle signals and responsively operate the vehicle gauges and the tell-tale indicators, the presentation device having a liquid crystal display (LCD) with a flash memory;
using an external electronic diagnostic tool and a controller area network (CAN) diagnostic interface within the presentation device to initiate data transfer to the vehicle instrument cluster;
transmitting data to a microcontroller within the presentation device and in communication with the liquid crystal display (LCD) in the presentation device using a high speed bi-directional infrared link directly between a source infrared (IR) transmitter provided on the external electronic diagnostic tool and a destination infrared (IR) receiver in the form of a universal asynchronous receiver transmitter (UART) provided on the microcontroller;
storing the transmitted data in the flash memory in the presentation device in bi-directional communication with the microcontroller;
checking for proper reception by the microcontroller of the infrared transmitted data via the external electronic diagnostic tool and the CAN diagnostic interface; and
issuing a command from the external electronic diagnostic tool directing how to employ the transmitted data to reprogram the microcontroller within the presentation device;
wherein using the external electronic diagnostic tool comprises locating the external electronic diagnostic tool proximate to the CAN diagnostic interface; and
wherein using the CAN diagnostic interface comprises using the destination infrared (IR) receiver provided on the presentation device to receive the transmitted data through the high speed infrared link.

2. The method of claim 1 wherein transmitting data comprises transmitting data through an infrared (IR) signal between the external electronic diagnostic tool and the microcontroller.

3. The method of claim 1 wherein transmitting the data comprises transmitting data from the external electronic diagnostic tool through the source infrared (IR) transmitter provided on the external electronic diagnostic tool.

4. The method of claim 3 wherein the destination IR receiver and the source IR transmitter each comprise transmitter/receiver pairs operable for bi-directional communication.

5. The method of claim 4, further comprising converting the IR signal with a photo detector to a logic level signal.

6. The method of claim 5 wherein converting the IR signal includes converting the IR signal with a photo transistor.

7. The method of claim 5 wherein converting the IR signal includes converting the IR signal with a photo diode.

8. A method of reprogramming a flash memory of a liquid crystal display (LCD) in a presentation device, the method comprising:
providing a vehicle instrument cluster having a housing, a transparent pane, a plurality of vehicle gauges, a plurality of tell-tale indicators, an instrument cluster controller and a presentation device, the transparent pane being coupled to the housing and defining a cavity in which the vehicle gauges, the tell-tale indicators, the display and the DIT/R are housed, the plurality of vehicle gauges comprising a vehicle speedometer and an engine tachometer, the instrument cluster controller being configured to receive vehicle signals and responsively operate the vehicle gauges and the tell-tale indicators, the presentation device having a liquid crystal display (LCD) and a microcontroller with a flash memory;
locating an external electronic diagnostic tool proximate to a controller area network (CAN) diagnostic interface, the CAN diagnostic interface being coupled to the instrument cluster controller;
transmitting data as an infrared (IR) signal from the external electronic diagnostic tool through a high speed bi-directional infrared link directly between a source infrared (IR) transmitter, which is provided on the external electronic diagnostic tool, and a destination infrared (IR) receiver in the form of a universal asynchronous receiver transmitter (UART) provided on the microcontroller of the presentation device such that the transmitted data is received through the high speed infrared link; and
using the received data to update the flash memory of the microcontroller.

9. The method of claim 8 wherein the destination IR receiver and the source IR transmitter each comprise transmitter/receiver pairs operable for bi-directional communication.

10. A method comprising:
providing a vehicle instrument cluster having a housing, a transparent pane, a plurality of vehicle gauges, a plurality of tell-tale indicators, an instrument cluster controller, a display and a destination infrared transmitter/receiver (DIT/R), the transparent pane being coupled to the housing and defining a cavity in which the vehicle gauges, the tell-tale indicators, the display and the DIT/R are housed, the plurality of vehicle gauges comprising a vehicle speedometer and an engine tachometer, the instrument cluster controller being configured to receive vehicle signals and responsively operate the vehicle gauges and the tell-tale indicators, the display comprising a liquid crystal display (LCD) and a display controller having a first portion, which consists of a programmable, non-volatile flash memory, and second portion that comprises a volatile memory, the display controller being coupled to the LCD and the instrument cluster controller, the DIT/R coupled to the instrument panel controller;
providing a hand-held programming tool having a source infrared transmitter receiver (SIT/R), the hand-held programming tool being an external electronic diagnostic tool;
locating the external electronic diagnostic tool proximate to a diagnostic interface of a controller area network (CAN);
using the hand-held programming tool and the controller area network (CAN) to ready the display controller for receipt of a first data file;
using the CAN diagnostic interface including transmitting the first data file from the SIT/R in the hand-held programming tool to the DIT/R via a high speed infrared link and using the DIT/R provided on the presentation device to receive the transmitted data through the high speed infrared link;

converting the first data file received by the DIT/R into a logic level signal;

storing a second data file in the volatile memory based on the logic level signal;

transmitting at least one signal from the DIT/R to the SIT/R to indicate that the first data file was properly transmitted to the DIT/R;

transmitting a programming command to the instrument cluster controller;

programming the non-volatile memory based on the second data file in the volatile memory in response to receipt of the programming command by the instrument cluster controller.

11. The method of claim 10, wherein the DIT/R is a universal asynchronous receiver transmitter (UART).

12. The method of claim 10, wherein a portion of the housing overhangs the transparent pane to shield the DIT/R from light.

* * * * *